Patented Apr. 24, 1934

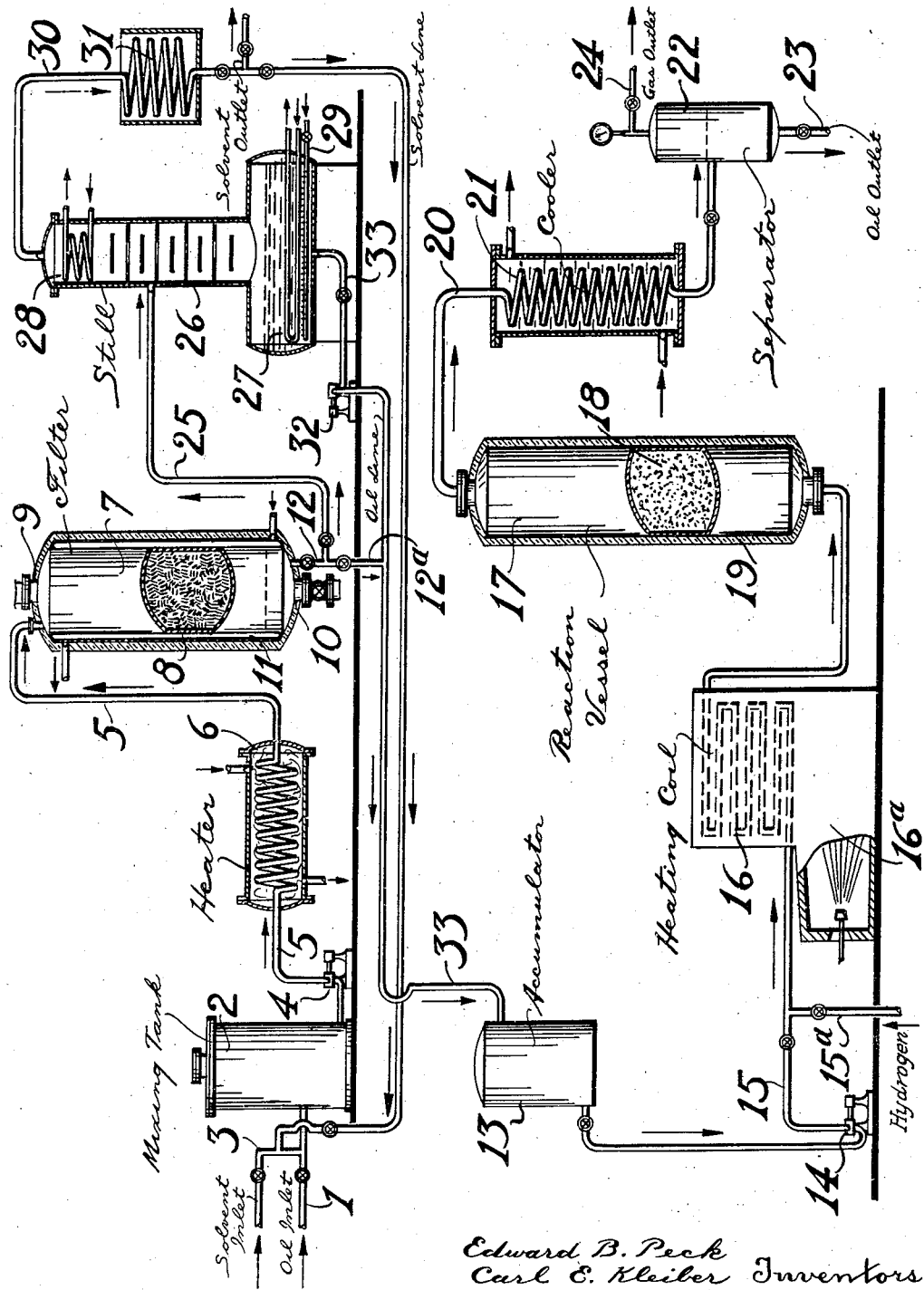

1,955,862

UNITED STATES PATENT OFFICE 1,955,862

PROCESS FOR DESTRUCTIVE HYDROGENATION OF HEAVY HYDROCARBON OILS

Edward B. Peck, Elizabeth, Carl E. Kleiber, Irvington, and Francis M. Archibald, Elizabeth, N. J., assignors, by mesne assignments, to Standard-I. G. Company, Linden, N. J., a corporation of Delaware Application November 13, 1929, Serial No. 406,991

3 Claims. (Cl. 196—53)

The present method relates to the production of valuable products from crude oil or other heavy unrefined hydrocarbon oils and more specifically comprises an improved method of pretreating the oil and subsequent refining with hydrogen under high temperature and pressure. Our method will be fully understood from the following description.

In the refining of heavy oils such as crude oils, heavy distillates or residue under high pressure with hydrogen in the presence or absence of catalytic materials, we have discovered that certain undesirable materials have a profound effect on the ease and efficiency of the reaction. Insoluble foreign material such as sand, pipe scale and the like as well as other soluble materials which appear to be naturally occuring impurities of high molecular weight perhaps of a gummy or resinous type, partially inhibit the hydrogenation reaction whether catalyst be used or not. It has been discovered that the removal of these impurities greatly improves the ease and operation of the reaction and if a catalyst be used its life is considerably lengthened.

The drawing is a simplified diagrammatic representation of apparatus suitable for the herein described process and indicates the flow of materials. The oil to be treated is supplied by line 1 to a suitable mixing tank or reservoir 2. A suitable solvent of low viscosity, such as naptha, may be supplied to this tank by line 3. The oil or mixture of oil and solvent is withdrawn from tank 2 by pump 4 and is forced through line 5, which may contain suitable heating means 6, into a filter 7. This filter is filled with an adsorption agent such as fuller's earth which is represented by 8. The filter may be provided with suitable means 9 and 10 for the admission and removal respectively of the adsorption agent and with a heating jacket 11 through which hot water or steam or other suitable heating medium may be circulated.

The filtered oil is withdrawn from the filter by line 12 and passed through lines 12a and 33 into an accumulating tank 13. If the oil is mixed with a solvent before filtration the oil and solvent mixture from the filter 7 passes through lines 12 and 25 into a still 26 which may be provided with suitable heating and cooling means 27 and 28 respectively. Open steam may also be admitted by line 29 if desired. The solvent is withdrawn as distillate through line 30 and condenser 31 and may be passed to suitable storage (not shown) or returned to the mixing tank 2 as desired. The oil is withdrawn from the still by pump 32 and is passed into tank 13 through line 33.

The oil is withdrawn from this tank by pump 14 and forced through line 15 and heating coil 16 in furnace 16a, into a reaction vessel 17 which is suitably constructed to withstand the high temperatures and pressures used for destructive hydrogenation. This reaction vessel is packed with lumps of a suitable sulfactive catalyst 18. The reaction vessel is preferably lagged with suitable heat insulating material 19. It may also be heated by suitable means, not shown, if desired. Hydrogen is supplied under high pressure by line 15a and is preferably passed in admixture with the oil through coil 16 and reaction vessel 17. The products leave the reaction vessel by line 20 and pass through cooler 21 into a separating vessel 22 from which the hydrogenated oil is withdrawn by line 23 to suitable storage (not shown). The gas is withdrawn from the separator by line 24 and may be purified and reused according to the usual hydrogenation practice.

Our method comprises removal of the solid materials by filtration of the oil through sand or the like but we prefer adsorption agents, such as fuller's earth or other active clays, bentonite, silica gel, active charcoal or the like, which not only remove the solids but also the soluble hydrogenation inhibitors. The oil is preferably pumped or allowed to flow through a bed of the material in coarse grains or lumps but the adsorption agent may be used in finely ground form and agitated with the oil prior to or after filtration and then removed by settling, centrifugal means or filtration. This preliminary treatment may be carried out in the cold but the adsorption is more rapid if the temperature is raised somewhat above normal. The exact temperature depends on the flash point of the oil for the sake of safety.

The clay or other absorption treatment may be done in a single batch or in several batches with the same or different agents and it is generally desirable to precede the clay treatment with an acid treatment although that is not required. The amount of clay required varies with its activity but is generally between 1.5 to 10 lbs./barrel of oil.

Any suitable means for carrying out the hydrogenation method under pressure is satisfactory. The oil may be held in bulk under pressure of 20 to 200 atmospheres pressure or higher in presence of a suitable catalytic agent which may comprise metallic oxides such as chromium oxide, molybdenum oxide, tungsten oxide either alone or in admixture with each other or other oxides such as alumina, magnesia, the rare earth oxides, alkali oxides, alkaline earth oxides, zinc oxide and the like or sulphides of these materials. All of these catalytic materials are sulfactive, that is are not poisoned by or in the presence of sulfur or sulfur-containing compounds. The oil is held at a temperature between the approximate limits of 750° and 870° F. The catalyst may be in lump form and the hot oil passed through or over it mixed with hydrogen or it may be in finely ground form suspended in the oil which is thoroughly agitated by suitable stirring means. The bulk of oil may be heated in any suitable manner, for example, by internal electric heaters or it may be heated sufficiently prior to discharge into the reaction drum or chamber holding the catalyst.

The hydrogenation treatment results in a general decrease in viscosity and production of products of lower molecular weight and boiling point. If desired, the higher boiling feed stock may be converted substantially completely to naphtha boiling below about 400° F. together with non-condensable gas. The yield of liquid is frequently better than 100% by volume. On the other hand, the hydrogenation may be controlled so as to produce valuable refined lubricating cuts of the highest grade. Our invention is of especial importance for production of lubricating oils, since in general temperature is lower than for the production of large quantities of naphtha and the inhibiting effect of the impurities removed by the pretreatment is of greater consequence. As an example of the operation of our process Burbank crude is topped to a 55% bottoms and the residue is given a treatment with 25 pounds of acid (98% sulphuric acid by weight) per barrel; the oil is then separated from the sludge and blown sweet with air. This oil is then distilled with steam until a residue having a viscosity of 155 seconds Saybolt at 210° F. is obtained. Naphtha is added in proportion of about 65% naphtha to 35% heavy oil and the oil is filtered through fuller's earth.

The oil was then distilled to remove the naphtha and further reduced to viscosity of about 150 sec. Saybolt at 100° F. The oil has the following characteristics:

| | |
|---|---|
| Gravity | 23.1 A. P. I. |
| Vis. @ 100° F | 2714 Saybolt seconds |
| Vis. @ 210° F | 149 Saybolt seconds |
| Pour | 30° F. |
| Flash | 515° F. |
| Carbon | 2.5% |

The oil was treated with excess of hydrogen at a feed rate of ⅓ volume of oil per volume of catalyst space which is maintained at 3000 pound/sq. in. and 774° F. The gas rate was approximately 250 volumes of gas per volume of oil and the catalyst comprised a mixture of chromium and molybdenum oxides.

The oil recovered totaled over 100% of the feed by volume of which 75% had the following characteristics.

| | |
|---|---|
| Vis. @ 100° F | 1573 sec. Saybolt |
| Vis. @ 210° F | 116 sec. Saybolt |
| Pour | 35° F. |
| Flash | 535° F. |
| Carbon | .85% |

Our invention is not to be limited by any theory of the mechanism of the process nor to any specific means for its accomplishment nor to details given in any example for illustrative purposes, but only by the following claims in which we wish to claim all novelty inherent in our invention.

We claim:

1. An improved process for obtaining valuable products from heavy unrefined liquid hydrocarbons which comprises preliminary treatment with a solid non-metallic adsorption agent of the class of fuller's earth and other active clays, active carbon, and silica gel, in liquid phase at a temperature below the flash point of the oil, whereby soluble, tarry and resinous constituents of high molecular weight are adsorbed and thereby removed from the oil, then destructive hydrogenation in the presence of a catalyst of the sulphactive type in solid form.

2. An improved process for obtaining high grade lubricating oils from unrefined lubricating fractions of petroleum, which comprises preliminary treatment of the oil with a solid adsorption agent of the class of active clays, active carbon and silica gel, in liquid phase at a temperature below the flash point of the oil, whereby soluble, tarry and resinous constituents of high molecular weight are adsorbed and thereby removed from the oil, then destructive hydrogenation of the oil by passage through a reaction zone containing a solid sulphactive catalyst in lump form.

3. An improved process for obtaining high grade lubricating oils from unrefined lubricating fractions of petroleum which comprises preliminary filtration of the oil in liquid phase at a temperature below its flash point through a bed of active adsorption clay under a condition adapted to the removal of soluble, tarry and resinous constituents of high molecular weight, followed by destructive hydrogenation in the presence of a stationary catalyst of the sulphactive type in lump form.

EDWARD B. PECK.
CARL E. KLEIBER.
FRANCIS M. ARCHIBALD.